Sept. 20, 1938.  H. C. HUEGLIN  2,130,497
MOTOR MOUNTING FOR EXHAUST FANS AND THE LIKE
Filed Jan. 8, 1937
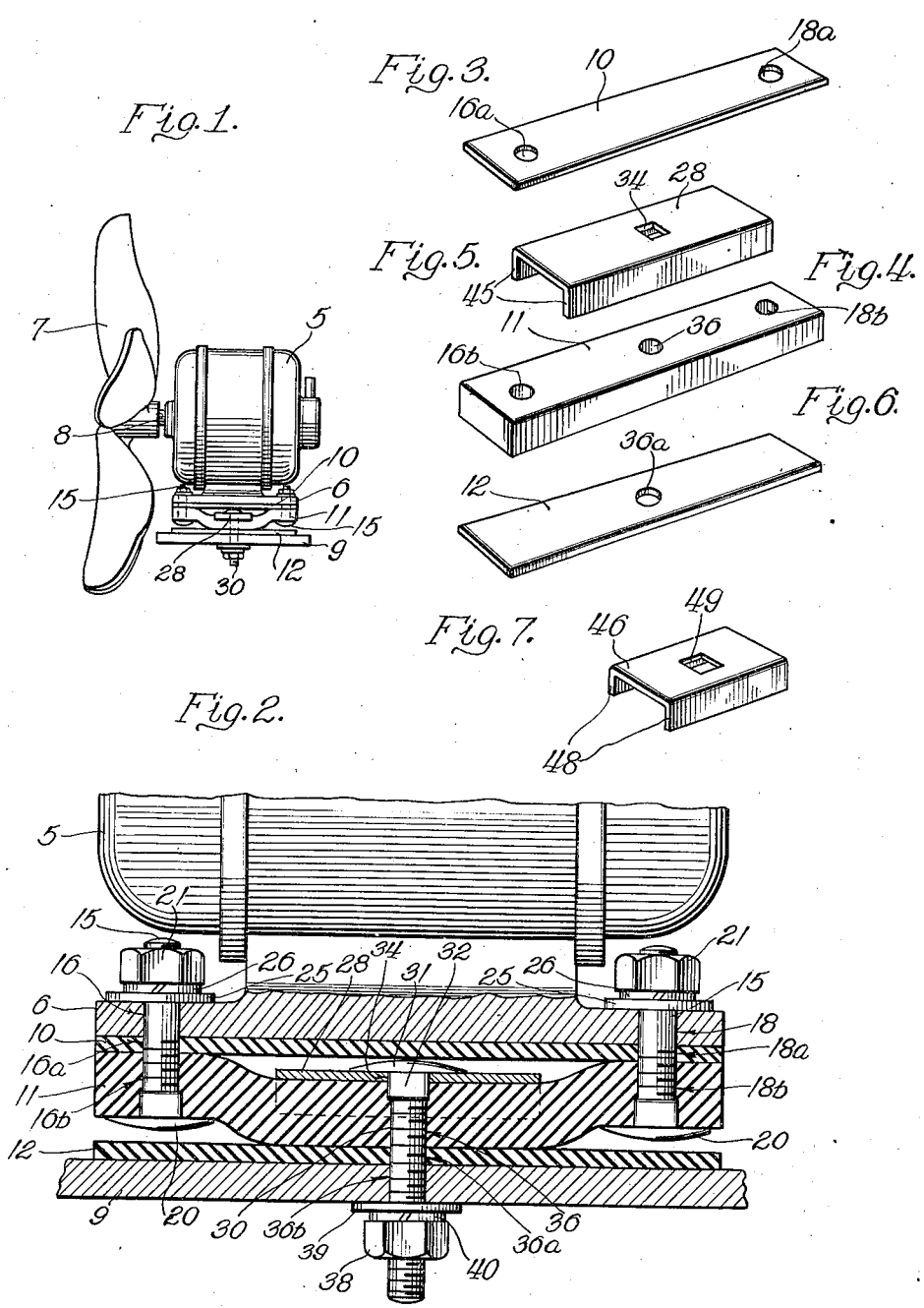
Inventor
Herman C. Hueglin
By Brown, Jackson, Boettcher & Dienner
Attys Patented Sept. 20, 1938

2,130,497

UNITED STATES PATENT OFFICE 2,130,497

MOTOR MOUNTING FOR EXHAUST FANS AND THE LIKE

Herman C. Hueglin, Chicago, Ill., assignor to Airmaster Corporation, Chicago, Ill., a corporation of Illinois Application January 8, 1937, Serial No. 119,596

7 Claims. (Cl. 248—22)

This invention relates to a motor mounting for exhaust fans and the like.

One of the main objects of the invention is to provide an improved mounting which will dampen vibration and insure smooth and quiet operation of devices of this sort.

It is also an object to provide an improved mounting which will produce the results above set forth and in which, at the same time, the resiliency of the mounting may be readily reduced or increased as desired.

A further object is to provide a mounting in which the attachment members between the resilient mounting means and the motor base, and between the motor support and the resilient mounting means, are fully cushioned with respect to the base of the motor and the motor support; also, a resilient mounting which is of simple and inexpensive construction, easily assembled and dismantled, and with which, when assembled, the parts are firmly secured together, and, at the same time, in a yielding manner for the purposes set forth.

Further objects and advantages of the invention will appear from the following detailed description, taken in connection with the accompanying drawing, in which:

Figure 1 is a side elevational view on a reduced scale, showing a mounting embodying the present invention, in connection with the motor of an exhaust fan;

Figure 2 is a longitudinal sectional view through the resilient mounting shown in Figure 1, showing the motor fragmentarily with its base and the motor support in section;

Figure 3 is a perspective view of the upper resilient mounting strip;

Figure 4 is a perspective view of the intermediate resilient mounting strip;

Figure 5 is a perspective view of one of the metallic channel members which cooperates with the intermediate resilient mounting strip to produce the desired resilience in the mounting;

Figure 6 is a perspective view of the lower resilient mounting strip; and

Figure 7 is a perspective view of a channel member similar to the channel member shown in Figure 5 but of shorter length to provide more resilience in the mounting.

Referring to the drawing, the electric motor, indicated fragmentarily at 5, has a suitable base 6. The fan 7, which may be an exhaust fan such as used in air circulator devices and the like, is fixed upon and driven by the shaft 8 of the motor 5, and a motor support is indicated at 9. The motor base 6 and motor support 9 are usually of rigid metallic or other suitable construction.

The resilient mounting means of the present invention is interposed between the motor base 6 and the motor support 9, and comprises upper, intermediate, and lower resilient mounting strips 10, 11 and 12, respectively, formed of rubber or other suitable resilient non-metallic material. In the illustrated embodiment of the invention, these strips 10, 11 and 12 are of elongated rectangular form, but it is to be understood that the particular configuration of these strips may vary widely within the scope of the present invention. Furthermore, although I have shown only one set of three resilient mounting strips between the base of the motor and the motor support, it is to be understood that a plurality of such sets of strips may be employed in mounting the motor or other device in accordance with the present invention.

The motor base 6 is attached to the opposite ends of the upper two resilient strips 10 and 11 by two bolts 15, the motor base 6 and strips 10 and 11 having registering apertures 16, 16a and 16b for the bolt 15 at one end, and registering apertures 18, 18a and 18b for the bolt 15 at the opposite end. The lower ends of the bolts 15 have heads 29 which underlie the intermediate strip 11 and cooperate with the under-surface thereof, and the upper ends of the bolts 15 have threaded engagement with nuts 21 which bind the opposite ends of the resilient strips 10 and 11 securely to the bottom of the motor base 6. Washers 25 and split spring washers 26 may be placed on the bolts 15 between the motor base 9 and the nuts 21.

A metallic channel member 28 fits down over the top of the intermediate portion of the intermediate resilient strip 11 between the bolts 15, and the channel member 28, intermediate resilient strip 11, and the lower resilient strip 12 are attached to the motor support 9 by a bolt 30 disposed intermediate the bolts 15. The bolt 30 has a head 31 which overlies the channel member 28 and cooperates with the upper surface thereof. This head 31 is disposed between the top of the channel member 28 and the under surface of the upper resilient strip 10. Adjacent the head 28 the bolt 30 has a portion 32 of square or other noncircular form which fits the opening 34 of square or other corresponding non-circular form in the channel member 28 and prevents turning of the bolt 30 with respect to the channel member.

The resilient strips 11 and 12 and motor support 9 have registering openings 36, 36a and 36b for the bolt 30, and the lower end of this bolt has threaded engagement with a nut 38 which binds the intermediate portions of the strips 11 and 12 securely to the motor support 9. A washer 39 and a split spring washer 40 may be placed on the bolt 30 between the bottom of the motor support 9 and the nut 38.

From the foregoing description and the drawing, it will now be apparent that the intermediate resilient strip 11 is secured near its opposite ends to the motor base 6 by the bolts 15 and, intermediate its ends, by the bolt 30 to the motor support 9. It constitutes a yielding connection or mounting between the motor base 6 and the motor support 9, and is preferably substantially heavier than the resilient strips 10 and 12. The channel member 28 closely embraces the top of the intermediate resilient strip or block 11, with its flanges 45 extending down along the sides of the strip or block 11, thereby confining and stiffening the strip or block 11 intermediate the bolts 15 to provide the desired resiliency in the mounting.

If more resilience is desired, a shorter metallic channel member 46 (Figure 7) is used in place of the longer channel member 28 (Figures 2 and 5), thereby stiffening the intermediate resilient strip or block 11 but over a shorter length, and, by such shorter extent of stiffening, providing more resilience in the mounting of the motor on the support 9. Where the shorter channel member 46 is used, the flanges 48 of this channel member extend down along the sides of the strip or block 11 in the manner in which the flanges of the channel member 28 extend down along the sides of the strip or block 11 when this channel member 28 is used. The channel member 46 has a square or other non-circular opening 49 corresponding to the opening 34 of the channel member 28.

The resilient mounting is of simple and inexpensive construction, easily assembled and dismantled, and, when assembled, the parts are firmly secured together and, at the same time, in a yielding manner. The head 31 of the bolt 30 is fully cushioned from the motor base 6 by the overlying intermediate portion of the upper resilient strip 10, and the heads 20 of the bolts 15 are fully cushioned from the motor support 9 by the underlying ends of the lower resilient strip 12.

While I have shown and described the invention as a resilient motor mounting for exhaust fans and the like, it is to be understood that the invention is not limited to this particular use but may be employed elsewhere as suitable or desired. Furthermore, I do not intend to be limited to the precise details shown or described.

I claim:

1. In combination, a first member, a supporting member therefor, a resilient mounting for mounting said first member on said supporting member, said resilient mounting comprising a resilient plastic member, means for securing the intermediate portion of said resilient plastic member to one of said first two members, and means for securing the other of said first two members to said resilient plastic member at opposite sides of said first securing means, the means for securing the intermediate portion of said resilient member to one of said first two members including a means whereby the stiffness of the resilient member may be varied.

2. In combination, a motor having a base, a support for said motor, a resilient mounting for mounting said motor on said support, said resilient mounting comprising upper, intermediate and lower resilient members, means for securing the intermediate portions of the intermediate and lower resilient members to said motor support, and means for securing the intermediate and upper resilient members to said motor base at opposite sides of said first securing means, said upper, intermediate and lower resilient members being substantially coextensive.

3. In combination, a motor having a base, a support for said motor, a resilient mounting for mounting said motor on said support, said resilient mounting comprising upper, intermediate and lower resilient members, means for securing the intermediate portions of the intermediate and lower resilient members to said motor support, and means for securing the intermediate and upper resilient members to said motor base at opposite sides of said first securing means, the upper resilient member overlying the upper end of said first securing means to cushion same from the motor base.

4. In combination, a motor having a base, a support for said motor, a resilient mounting for mounting said motor on said support, said resilient mounting comprising upper, intermediate and lower resilient members, means for securing the intermediate portions of the intermediate and lower resilient members to said motor support, and means for securing the intermediate and upper resilient members to said motor base at opposite sides of said first securing means, the opposite ends of said lower resilient member underlying said last securing means to cushion same from the motor support.

5. In combination, a motor having a base, a support for said motor, a resilient mounting for mounting said motor on said support, said resilient mounting comprising upper, intermediate and lower resilient members, means for securing the intermediate portions of the intermediate and lower resilient members to said motor support, means for securing the intermediate and upper resilient members to said motor base at opposite sides of said first securing means, and a rigid channel member secured by said first securing means in position embracing the intermediate portion of said intermediate resilient member and of a length to stiffen the intermediate portion of said resilient member to provide the desired resilience in said mounting.

6. In combination, a motor having a base, a support for said motor, upper, intermediate and lower resilient strips interposed between the motor base and said support, a pair of bolts attaching the ends of said upper and intermediate resilient strips to the motor base, a bolt attaching the intermediate and lower resilient strips to the motor support intermediate said first bolts, and a rigid channel member secured by said last bolt in position embracing the intermediate portion of said intermediate resilient strip and of a length to stiffen the intermediate portion of said resilient strip to provide the desired resilience in said mounting.

7. In combination, a motor having a base, a support for said motor, upper, intermediate and lower resilient strips interposed between the motor base and said support, a pair of bolts attaching the ends of said intermediate and upper resilient strips to the motor base, a bolt attaching the intermediate and lower resilient strips to the motor support intermediate said first bolts, and interchangeable channel means adapted to be secured by said last bolt in position embracing the intermediate portion of said intermediate resilient strip to provide the desired resilience in said mounting.

HERMAN C. HUEGLIN.